(12) United States Patent
Deczky et al.

(10) Patent No.: US 8,306,438 B2
(45) Date of Patent: Nov. 6, 2012

(54) COHERENT OPTICAL RECEIVER SYSTEMS AND METHODS

(75) Inventors: Andrew Deczky, Ottawa (CA); Mark Edward Rollins, Stittsville (CA); Christian Bourget, Stittsville (CA)

(73) Assignee: Ciena Corporation, Hanover, MD (US)

( * ) Notice: Subject to any disclaimer, the term of this patent is extended or adjusted under 35 U.S.C. 154(b) by 269 days.

(21) Appl. No.: 12/758,422

(22) Filed: Apr. 12, 2010

(65) Prior Publication Data
US 2011/0249981 A1 Oct. 13, 2011

(51) Int. Cl.
*H04B 10/00* (2006.01)
*H04B 10/06* (2006.01)

(52) U.S. Cl. ......... 398/208; 398/202; 398/159; 398/161

(58) Field of Classification Search .................. 398/158, 398/159, 161, 163, 202–205, 208
See application file for complete search history.

(56) References Cited

U.S. PATENT DOCUMENTS

| | | | |
|---|---|---|---|
| 6,917,031 B1 | 7/2005 | Sun et al. | |
| 7,315,584 B1 | 1/2008 | Epworth et al. | |
| 7,627,252 B2* | 12/2009 | Sun et al. | 398/155 |
| 7,894,728 B1* | 2/2011 | Sun et al. | 398/208 |
| 2009/0141831 A1* | 6/2009 | Tao et al. | 375/325 |
| 2010/0209121 A1* | 8/2010 | Tanimura | 398/202 |
| 2010/0329677 A1* | 12/2010 | Kaneda et al. | 398/65 |
| 2011/0194855 A1* | 8/2011 | Batshon et al. | 398/65 |

OTHER PUBLICATIONS

E. Zip and j. M. Kahn, "Digital Equalization of Chromatic Dispersion and Polarization Mode Dispersion", IEEE Journal of Llghtwave Technology, vol. 25, No. 8, Aug. 2007, pp. 2033-2043.
M. S. Alfiad et al., A Comparison of Electrical and Optical Dispersion Compensation for 111-Gb/s POLMUX-RZ-DQPSK, IEEE Journal of Llghtwave Technolgy, vol. 27, No. 16, Aug. 2009, pp. 3590-3598.
I. Fatadin et al., "Compensation of Quadrature Imbalance in an Optical QPSK Coherent receiver", IEEE Photonics Technology Letters, vol. 20, No. 20, Oct. 15, 2008, pp. 1733-1735.
C. S. Petru et al., Impact of Transmitter and Receiver Imperfections on the Performance of Coherent Optical QPSK Communication Systems, 21st Meeting of the IEEE Lasers and Electro Optics Society, Nov. 2008, pp. 410-411.
A. Tarighat et al., "Compensation Schemes and Performance Analysis of IQ Imbalance in OFDM receivers", IEEE Trans on Signal Processing, vol. 53, No. 8, Aug. 2005, pp. 3257-3267.
M. Valkama et al., "Advanced Methods for IQ Imbalance Compensation in Communication Systems", IEEE Transactions on Signal Processing, vol. 53, No. 10, Oct. 2001, pp. 2335-2344.

(Continued)

*Primary Examiner* — Dalzid Singh
(74) *Attorney, Agent, or Firm* — Clements Bernard PLLC; Christopher L. Bernard; Lawrence A. Baratta, Jr.

(57) ABSTRACT

The present disclosure relates to coherent optical receiver systems and methods for determining and correcting for optical angle and magnitude imbalance and for delay imbalance between quadrature paths. The present invention iteratively determines and corrects imbalance error and differential delay entirely in the digital domain (after an analog to digital conversion) in the presence of all the other impairments (polarization mode dispersion, chromatic dispersion, polarization gain imbalance, and polarization delay imbalance) using only the corrupted received signal during normal operation, i.e. without the use of training data. The present invention provides an effective adaptive scheme to drive impairments to zero, without using of any calibration of training, and may be applied during normal operation of the receiver via electrical circuitry or the like.

17 Claims, 12 Drawing Sheets

OTHER PUBLICATIONS

T. Tanimura et al., "A Simple Digital Skew Compensator for Coherent Receiver", ECOC 2009, Sep. 20-24, 2009, Paper 7.3.2.

L. Erup, F. M. Gardner, "Interpolation in Digital Modems—Part II: Implementation and Performance", IEEE Transactions on Communications, vol. 41, No. 6, Jun. 1992, pp. 998-1008.

M. S. Alfiad, D. van den Borne, S. L. Jansen, T. Wuth, M. Kuschnerov, G. Grosso, A. Napoli, H. de Waardt, 111-Gb/s POLMUX-RZ-DQPSK Transmission over LEAF: Optical versus Electrical Dispersion Compensation, (c) 2009 Optical Society of America 2009.

* cited by examiner

COHERENT OPTICAL RECEIVER SYSTEMS AND METHODS

FIELD OF THE INVENTION

The present invention relates generally to coherent optical receivers for optical transmission systems. More particularly, the present invention relates to coherent optical receiver systems and methods for determining and correcting for optical angle and magnitude imbalance and for delay imbalance between quadrature paths.

BACKGROUND OF THE INVENTION

Currently proposed high speed transmission systems over optical fiber (e.g. 100 Gbps and beyond) use multiple bits per symbol as well as multiple polarizations in order to reduce cost and complexity of the design. Disadvantageously, high speed transmission over optical fiber suffers from a number of well known impairments including polarization-mode dispersion (PMD) where a signal on one polarization at a receiver is a mixture of the polarization signals transmitted, chromatic dispersion (CD) where the signal is subjected to a parabolic increasing phase distortion along the fiber, polarization gain imbalance where the gain of the two polarizations is not the same, and polarization delay imbalance where the travel time of the two polarizations is not the same. In a typical high speed transmission system implementation, two optical polarizations may be used with Quadrature Amplitude Modulation (QAM) on two orthogonal carriers on each polarization. Also, Quadrature Phase Shift Keying (QPSK) with four phases is a subset of such modulations. At a receiver of such a system, the two polarizations are typically recovered in an optical module where the quadrature signals are demodulated to baseband and converted to two quadrature electrical signals for each polarization. These four electrical signals are then transmitted to four analog to digital converters (ADC) followed by further processing in the digital domain.

Of note, the two demodulated signals of each polarization through the two ADCs are typically not fully orthogonal. While these impairments can be minimized using careful analog design, they cannot be completely eliminated, and their effect is a degradation of performance that increases quite fast as the magnitude of these impairments increases (see, e.g. I. Fatadin et al, "Compensation of Quadrature Imbalance in an Optical QPSK Coherent receiver", IEEE Photonics Technology Letters, Vol. 20, No. 20, Oct. 15, 2008, pp 1733-1735). Conventional systems and methods for compensating the angle and magnitude imbalance introduced by the demodulator have been proposed, see, e.g., Fatadin et al.; C. S. Petru et al., "Impact of Transmitter and Receiver Imperfections on the Performance of Coherent Optical QPSK Communication Systems", 21st Meeting of the IEEE Lasers and Electro Optics Society, November 2008, pp 410-411; A. Tarighat et al., "Compensation schemes and Performance Analysis of IQ Imbalance in OFDM receivers", IEEE Trans on Signal Processing, Vol 53, No 8, August 2005, pp 3257-3267; and M. Valkama et al., "Advanced Methods for IQ Imbalance Compensation in Communication Systems", IEEE Transactions on Signal Processing, Vol. 53, No. 10, October 201, pp 2335-2344. However, most of these methods deal with Orthogonal frequency-division multiplexing (OFDM) systems where multiple frequency tones are used to carry the information and the compensation is applied to these tones, typically in the frequency domain. Fatadin et al. deal with determining a compensation matrix directly from the correlations of the received data. Tarighat et al. propose a Least Mean Square (LMS) technique for updating the correction matrix based on transmitted training symbols either during a separate training period or as part of the transmission, leading to a loss of efficiency.

Additionally, the delay of the two demodulated signals of each polarization through the ADCs is not exactly equal. Similar to the orthogonal impairments, these impairments may be minimized using careful analog design but they cannot be completely eliminated, and their effect is a degradation of performance that increases quite fast as the magnitude of these impairments increases (see, e.g. T. Tanimura et al., "A Simple Digital Skew Compensator for Coherent Receiver", ECOC 2009, 20-24 September, 2009, Paper 7.3.2). Conventional systems and methods for compensating for the time delay between quadrature paths using an finite impulse response (FIR) filter have been proposed in Tanimura et al. Tanimura et al. only deal with implementing a compensating interpolator for benefits obtained in high CD and PMD systems. However, Tanimura et al. do not give a method of deriving necessary delay parameters from the received data in the presence of such impairments.

BRIEF SUMMARY OF THE INVENTION

In various exemplary embodiments, a coherent receiver includes digital circuitry configured to receive an input signal representing a quadrature modulated signal; and iterative updating circuitry configured to determine and correct for any of optical angle and magnitude imbalance and for delay imbalance between quadrature paths of the input signal. The coherent receiver may further include analog to digital conversion circuitry configured to receive the input signal in an analog form from a demodulator and to convert the input signal into a digital form for the digital circuitry. The input signal includes a real part and an imaginary part, and wherein the iterative updating circuitry is configured to process the real part and the imaginary part to form an output signal. To determine and correct for optical angle and magnitude imbalance, the iterative updating circuitry is configured to process the real part and the imaginary part of the received input signal with correction coefficients to form the output signal; and iteratively update the correction coefficients responsive to the output signal. Optionally, the iterative updating circuitry is configured to perform a gradient descent update algorithm on the correction coefficients. The iterative updating circuitry is configured to correct for relative optical angle and magnitude imbalance between the quadrature paths, and wherein the iterative updating circuitry only processing one of the real part and the imaginary part with the correction coefficients. The correction coefficients are defined as $c_1$ and $c_2$, the real part of the input signal is defined as $x_r$, and the imaginary part the input signal is defined as $x_i$, a real part of the output signal is defined as $x_{rc}$, and an imaginary part of the output signal is defined as $x_{ic}$, and wherein the iterative updating circuitry is configured to set the real part of the output signal, $x_{rc}$, equal to the real part of the input signal, $x_r$, and to apply the correction coefficients, $c_1$ and $c_2$, to the imaginary part of the input signal, $x_i$, to form the imaginary part of the output signal, $x_{ic}$. The correction coefficients, $c_1$ and $c_2$, are iteratively updated to provide imbalance correction without training symbols and while the coherent receiver is in operation. Alternatively, the iterative updating circuitry is configured to set the imaginary part of the output signal, $x_{ic}$, equal to the imaginary part of the input signal, $x_i$, and to apply the correction coefficients, $c_1$ and $c_2$, to the real part of the input signal, $x_r$, to form the real part of the output signal, $x_{rc}$. To determine and correct for delay imbalance between quadrature paths, the iterative updating circuitry is configured to process the real part of the received input signal each with a first delay and the imaginary part of the received input with a second delay to form an output signal; and iteratively update at least one of the first delay and the second delay responsive to the output signal. One of the first delay and the second delay includes a variable delay with the other includes a fixed delay. Optionally, the first delay includes a fixed delay of two sample; wherein the second delay includes a variable delay connected to a switch, the switch configured to connect the variable delay to the real part if a delay, δ, is less than or equal to zero or to the real part through a fixed delay of one sample if the delay is greater than zero; and wherein outputs from the first delay and the second delay are connected to an update block that iteratively determines the delay, δ, that in turn is used to set the variable delay. The switch may be further configured to connect to a plurality of fixed delays of one sample to provide delay compensation greater than one sample. The delay, δ, is iteratively updated to provide imbalance correction without training symbols and while the coherent receiver is in operation. The iterative updating circuitry operates prior to chromatic dispersion compensation. The coherent receiver may further include additional digital circuitry configured and iterative updating circuitry for another polarization.

In another exemplary embodiment, a method of determining and correcting for optical angle and magnitude imbalance in a coherent receiver includes receiving an input signal representing a quadrature modulated signal, wherein the input signal includes a real part and an imaginary part; processing the real part and the imaginary part of the received input signal with correction coefficients to form an output signal; and iteratively updating the correction coefficients responsive to the output signal. The method may further include demodulating a received signal to form the input signal in an analog format; and converting the input signal in the analog format to a digital format prior to processing the received input signal.

In yet another exemplary embodiment, a method of determining and correcting for delay imbalance between quadrature paths in a coherent receiver includes receiving an input signal representing a quadrature modulated signal, wherein the input signal includes a real part and an imaginary part; processing the real part of the received input signal each with a first delay and the imaginary part of the received input with a second delay to form an output signal; and iteratively updating at least one of the first delay and the second delay responsive to the output signal. The method may further include demodulating a received signal to form the input signal in an analog format; and converting the input signal in the analog format to a digital format prior to processing the received input signal.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present invention relates to coherent optical receiver systems and methods for determining and correcting for optical angle and magnitude imbalance and for delay imbalance between quadrature paths. The present invention iteratively determines and corrects imbalance error and differential delay entirely in the digital domain (after an ADC) in the presence of all the other impairments (PMD, CD, polarization gain imbalance, and polarization delay imbalance) using only the corrupted received signal during normal operation, i.e. without the use of training data. Advantageously, the present invention does not require training symbols, is able to track changes in imbalance and differential delay (e.g. due to temperature changes) during normal operation, can be applied to the severely distorted received signal without any additional processing or knowledge of the signal statistics, has very low complexity, and is applied entirely in the digital domain and hence provides precise, predictable performance.

Figure 1:
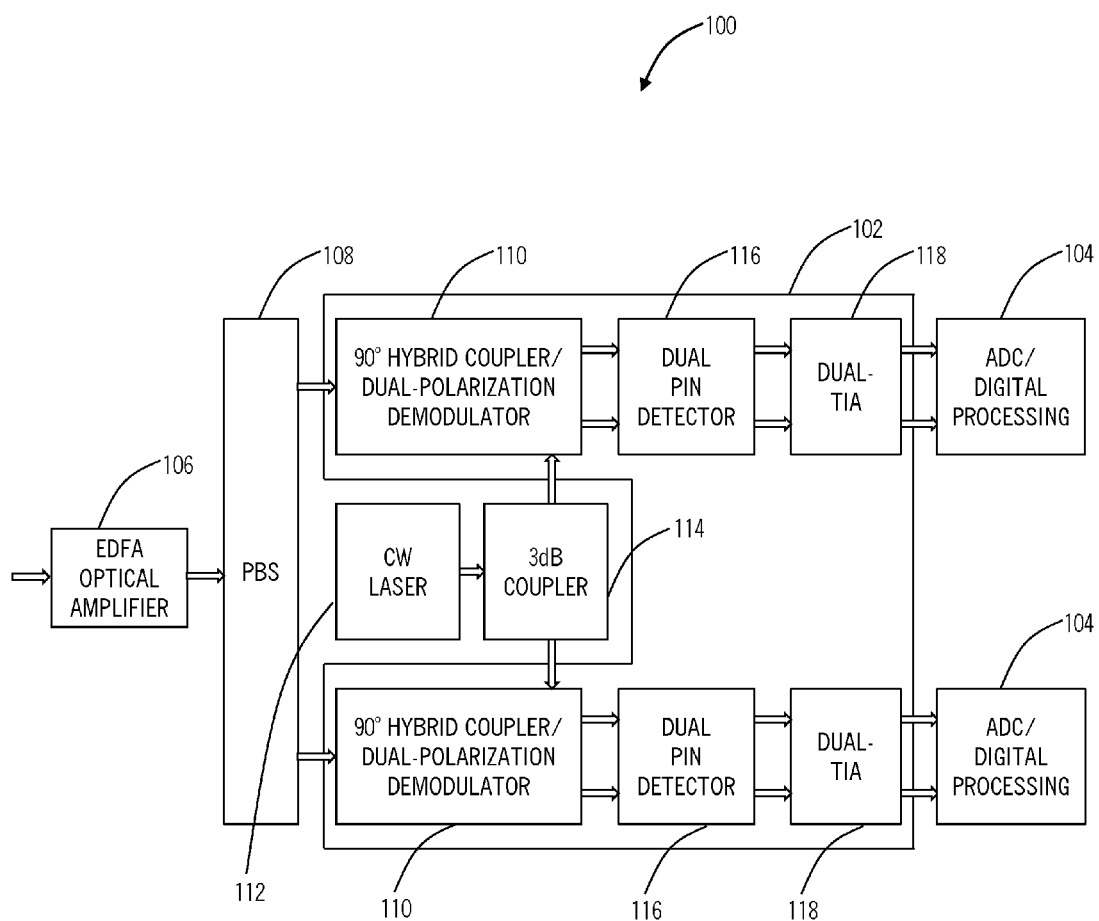
FIG. 1 is a receiver system with a coherent optical receiver module and ADC/digital processing circuitry for determining and correcting for optical angle and magnitude imbalance and for delay imbalance between quadrature paths.

Referring to FIG. 1, in an exemplary embodiment, a receiver system 100 is illustrated with a coherent optical receiver module 102 and ADC/digital processing circuitry 104 for determining and correcting for optical angle and magnitude imbalance and for delay imbalance between quadrature paths. The receiver system 100 includes an optical amplifier 106, such as an erbium doped fiber amplifier (EDFA), receiving a transmitted optical signal. An output of the optical amplifier 106 connects an amplified version of the transmitted optical signal to a polarization beam splitter (PBS) 108 that is configured to split the polarizations of the transmitted optical signal and connect each to a 90° hybrid coupler/dual-polarization demodulator 110. The coupler/demodulators 110 receive a reference source from a continuous wave (CW) laser 112 split to each of the coupler/demodulators 110 via a 3 dB coupler 114. The coupler/demodulators 110 are configured to demodulate the transmitted optical signal and connect to dual PIN photo-detectors 116. Outputs of the photo-detectors 116 connect to dual transimpedance amplifiers (TIA) 118 that in turn connect to the ADC/digital processing circuitry 104. For example, the receiver system 100 may include two optical polarizations each with Quadrature Amplitude Modulation (QAM) on two orthogonal carriers on each polarization. Also, Quadrature Phase Shift Keying (QPSK) with four phases may be used. The two polarizations are typically recovered in the optical receiver module 102 where the quadrature signals are demodulated to baseband and converted to two quadrature electrical signals for each polarization. These four electrical signals are then transmitted to the ADC/digital processing circuitry 104 followed by further processing in the digital domain. The ADC/digital processing circuitry 104 is configured to provide digital domain processing to determine and correct for optical angle and magnitude imbalance and for delay imbalance between quadrature paths.

In an exemplary embodiment, the present invention deals with the compensation of a differential delay between the two demodulated quadrature signals on either polarization in a polarization multiplexed, quadrature modulated optical transmission system. The demodulated signal can be represented as a complex baseband signal with the two components being the real and imaginary parts, thus:

$$Xpol_{rx}(nT) = i_{rx}(nT) + jq_{rx}(nT)$$

and similarly for the Y polarization. Assume that the quadrature demodulator is not perfect and its output is given by:

$$i_{rx}(nT) = i_{tx}(nT)$$

$$q_{rx}(nT) = ai_{tx}(nT) + bq_{tx}(nT)$$

Where $$a = g\sin(\theta)\ b = g\cos(\theta)\ g = 10^{-lossdB/20}$$

Figure 2:
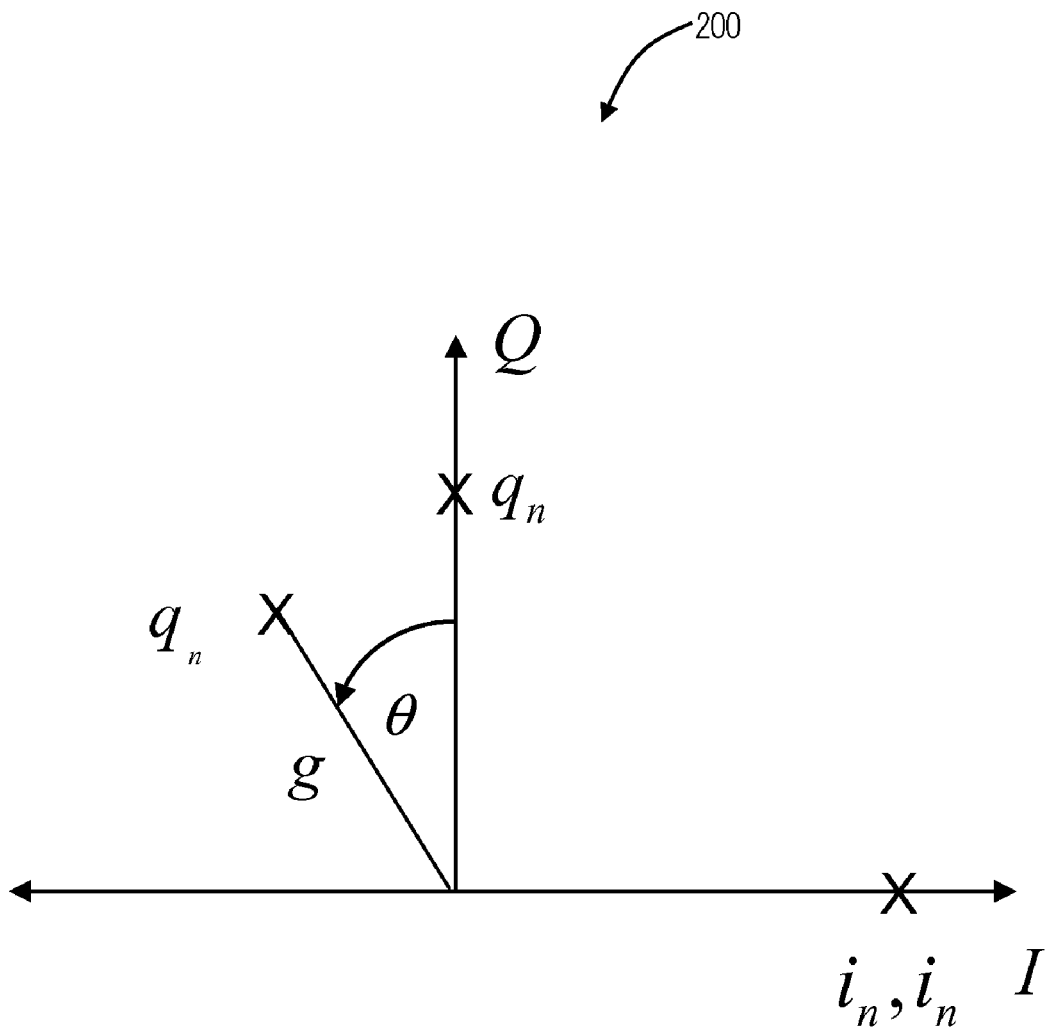
FIG. 2 is a graph of rotation and scaling of the q axis (quadrature) by a gain g and an angle θ relative to the i axis (in-phase)
Figure 3:
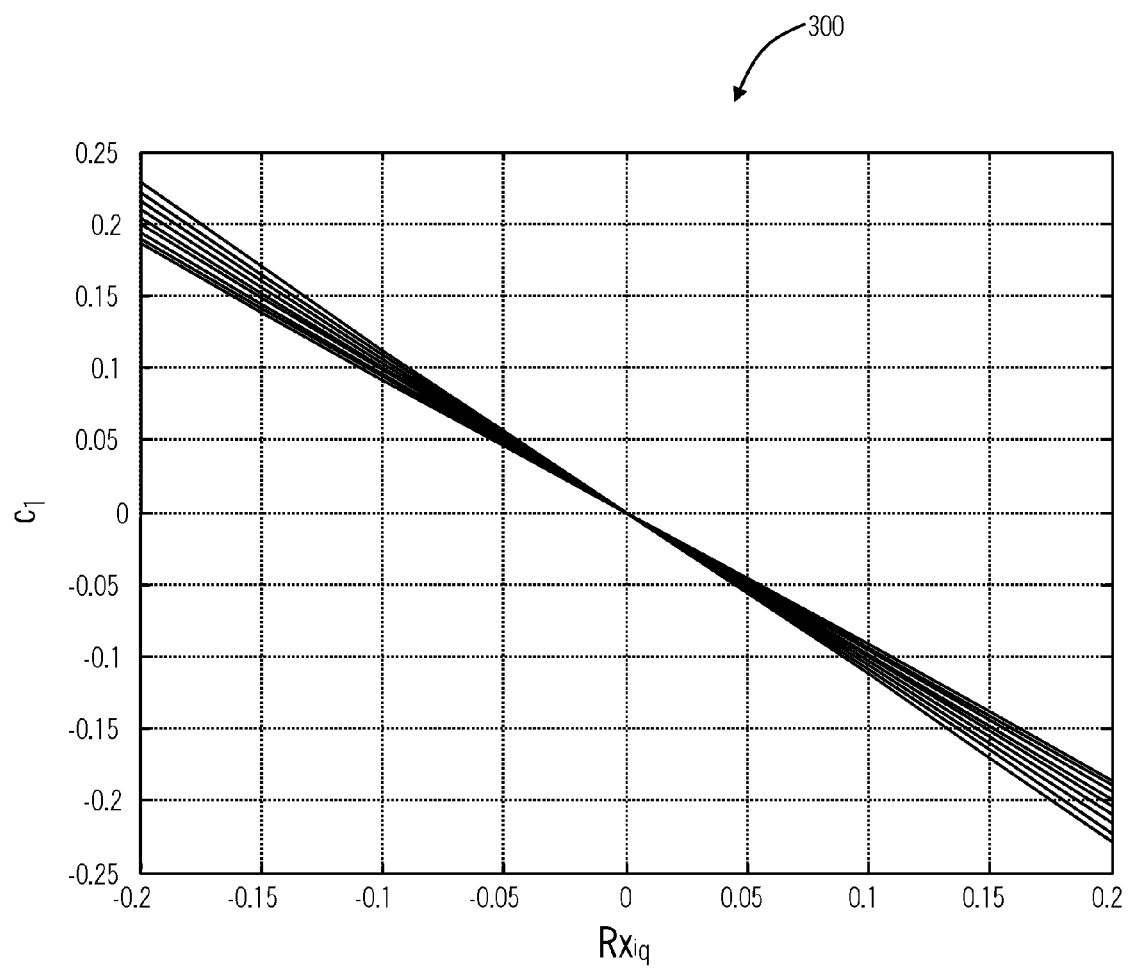
FIG. 3 is a graph plotting correction coefficient $c_1$ as a function of correlation $Rx_{iq}$ with correlations ($Rx_{qq}-Rx_{ii}$) as a parameter.
Figure 4:
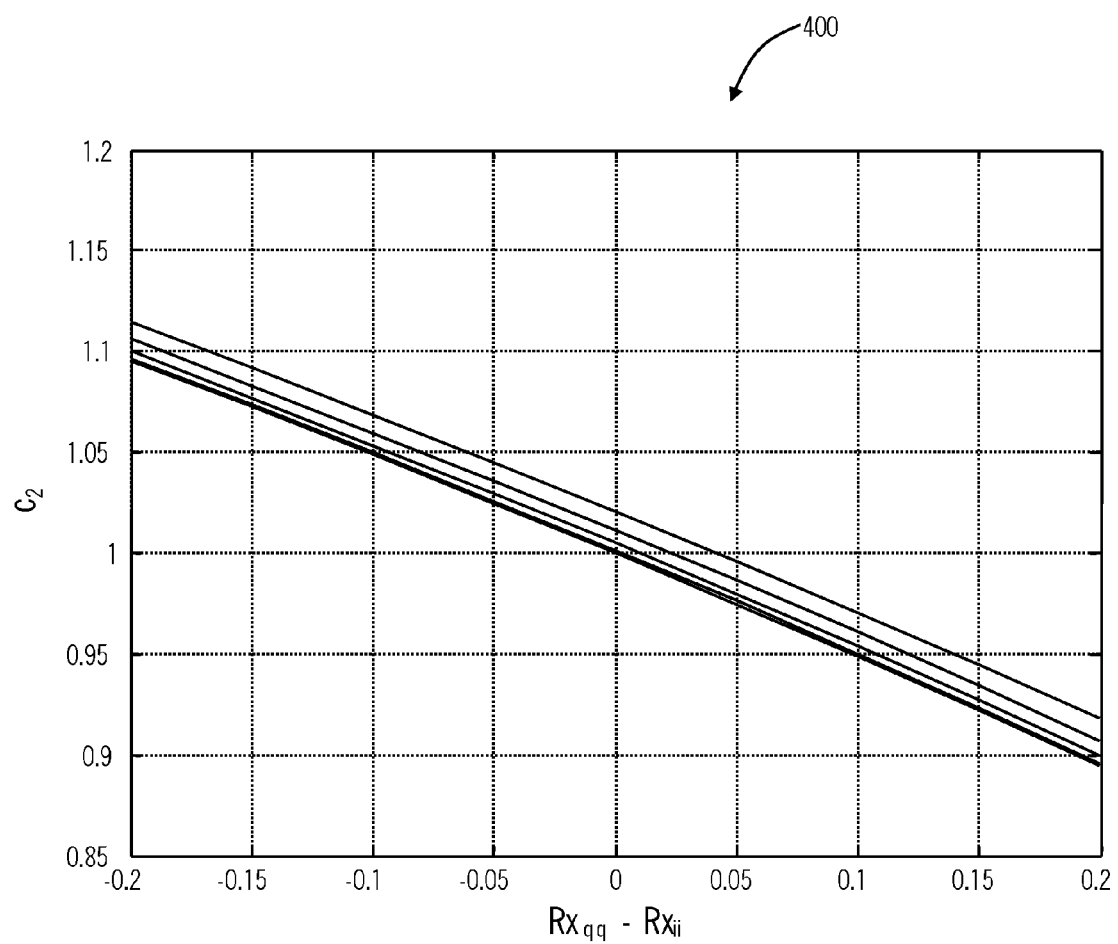
FIG. 4 is a graph plotting correction coefficient $c_2$ as a function of correlations ($Rx_{qq}-Rx_{ii}$) with correlation $Rx_{iq}$ as a parameter.

Referring to FIG. 2, a graph 200 illustrates a rotation and scaling of the q axis (quadrature) by a gain g and an angle $\theta$ relative to the i axis (in-phase). Here, $q_n$ and $i_n$ represent no rotation or scaling, and $q'_n$ and $i'_n$ represent the rotated and scaled axes. Assume that the impairment due to the demodulator is all on one side, e.g. the q axis. In practice, both sides will be affected, but only the relative angle between the I and Q signals is of interest so this simplification has no effect.

The correlations for each polarization are defined as follows:

$$Rx_{iq} = \frac{1}{N}\sum_{N} i_{rx}q_{rx}$$
$$= \frac{-a}{N}\sum_{N} i_{tx}i_{tx} + \frac{b}{N}\sum_{N} i_{tx}q_{tx}$$
$$= -ap^2$$

$$Rx_{ii} = \frac{1}{N}\sum_{N} i_{rx}i_{rx}$$
$$= p^2$$

-continued $$Rx_{qq} = \frac{1}{N}\sum_{N} q_{rx}q_{rx}$$
$$= \frac{a^2}{N}\sum_{N} i_{tx}i_{tx} - \frac{ab}{N}\sum_{N} i_{tx}q_{tx} + \frac{b^2}{N}\sum_{N} q_{tx}q_{tx}$$
$$= p^2 g^2$$

Where $$\frac{1}{N}\sum_{N} i_{tx}i_{tx} = \sum_{N} q_{tx}q_{tx} = p^2$$

$$\sum_{N} i_{tx}q_{tx} = 0$$

$$a^2 + b^2 = g^2$$

Setting $$r_1^2 = \frac{Rx_{qq}}{Rx_{ii}} = g^2$$

$$r_2 = \frac{Rx_{iq}}{Rx_{ii}} = -a$$

$$a = -r_2$$

$$b = \sqrt{r_1^2 - r_2^2}$$

Compensation is then applied using an inverse matrix defined as:

$$\begin{bmatrix} 1 & 0 \\ c_1 & c_2 \end{bmatrix}$$

$$c_1 = \frac{a}{b}$$

$$c_2 = \frac{1}{b}$$

The compensation is applied in the time domain as follows:

$$\begin{bmatrix} i'_n \\ q'_n \end{bmatrix} = \begin{bmatrix} 1 & 0 \\ c_1 & c_2 \end{bmatrix} \begin{bmatrix} i_n \\ q_n \end{bmatrix} \quad \text{Equation (1)}$$

The correction coefficients $c_1$, $c_2$ are obtained using a gradient descent approach. To this end, observe that $c_1$, $c_2$ can be expressed as functions of the following quantities:

$$c_1 = f((Rx_{qq} - Rx_{ii}), Rx_{iq})$$

$$c_2 = f((Rx_{qq} - Rx_{ii}), Rx_{iq})$$

Figure 5:
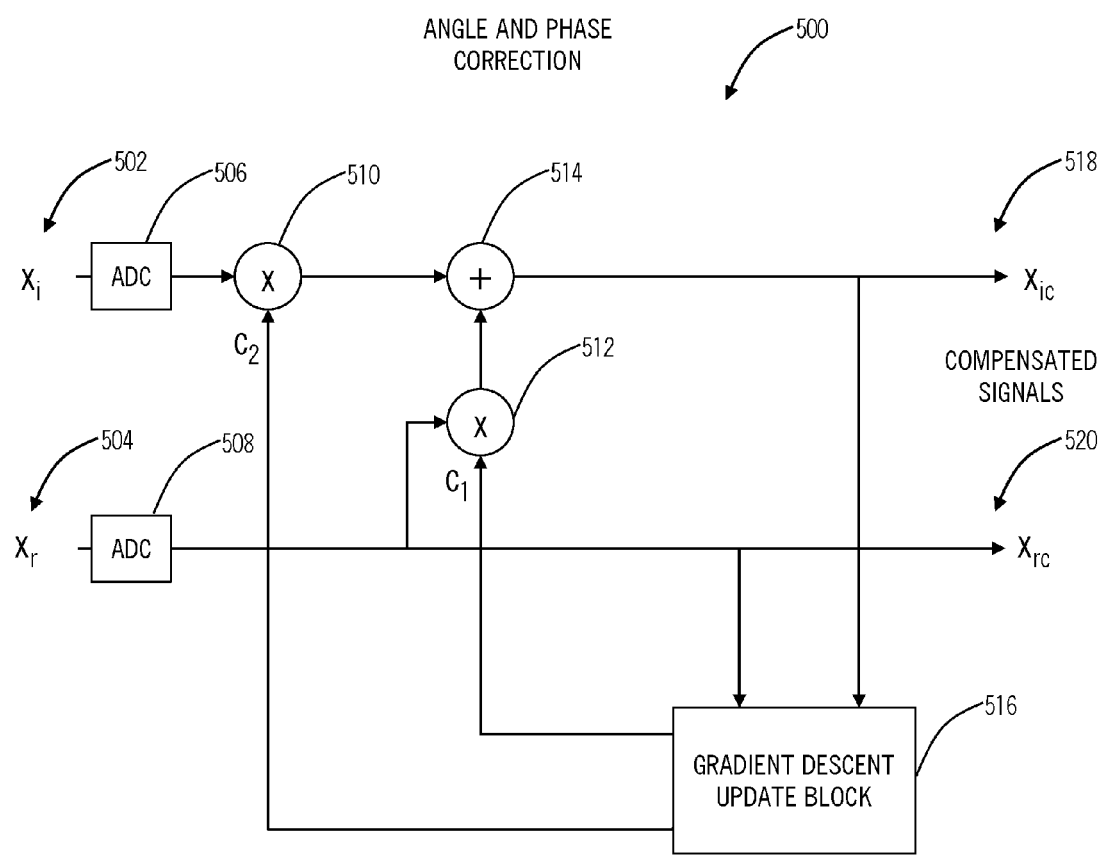
FIG. 5 is a block diagram of a correction system configured to correct angle and phase imbalance using gradient descent updates in the time domain.

Referring to FIGS. 3-6, a graph 300 plots $c_1$ as a function of $Rx_{iq}$ with $(Rx_{qq} - Rx_{ii})$ as a parameter, and a graph 400 plots $c_2$ as a function of $(Rx_{qq} - Rx_{ii})$ with $Rx_{iq}$ as a parameter. From these graphs 300, 400, it may be noted that $c_1$ depends mostly on $Rx_{iq}$ while $c_2$ depends mostly on $(Rx_{qq} - Rx_{ii})$. Thus, gradient descent update equations may be formed as follows:

$$c_1 = c_1 - \mu_1 Rx_{iq}$$

$$c_2 = c_2 - \mu_2 (Rx_{qq} - Rx_{ii})$$

where the correlations are computed based on the corrected output values as shown in FIG. 5.

FIG. 5 is a block diagram of a correction system 500 configured to correct angle and phase imbalance using gradient descent updates in the time domain. The correction system 500 is configured to iteratively determine and correct for optical angle and magnitude imbalance in a polarization in the presence of all the other impairments (PMD, CD, polarization gain imbalance, and polarization delay imbalance) using only the corrupted received signal during normal operation. Input variables $x_i$ 502 and $x_r$ 504 represent the imaginary and real parts of a complex signal for one polarization. Thus, for a dual polarization system with an x and y polarization (also referred to as a horizontal and vertical polarization), the correction system 500 is implemented for each polarization. In an exemplary embodiment, the correction system 500 is implemented in digital logic and receives the analog input variables $x_i$ 502 and $x_r$ 504 from a demodulator or the like. The correction system 500 may include ADCs 506, 508 to convert the analog input variables $x_i$ 502 and $x_r$ 504 to digital. Alternatively, the ADCs 506, 508 may be external to the correction system 500 with the input variables $x_i$ 502 and $x_r$ 504 already being in digital form. In general, the correction system 500 is configured to implement the compensation of an optical angle and magnitude imbalance between the two demodulated quadrature signals on either polarization in a polarization multiplexed, quadrature modulated optical transmission system described mathematically herein in equation (1). This is accomplished using an iterative optimization approach, such as a gradient descent approach, to obtain the correction coefficients $c_1$, $c_2$. Gradient descent is a first-order optimization algorithm that finds a local minimum of a function by taking steps proportional to the negative of the gradient (or of the approximate gradient) of the function at the current point. Thus, instead of using training symbols, the correction system 500 converges on a solution for the correction coefficients $c_1$, $c_2$. In addition to gradient descent, the present invention contemplates other optimization algorithms to determine the coefficients $c_1$, $c_2$.

Figure 6:
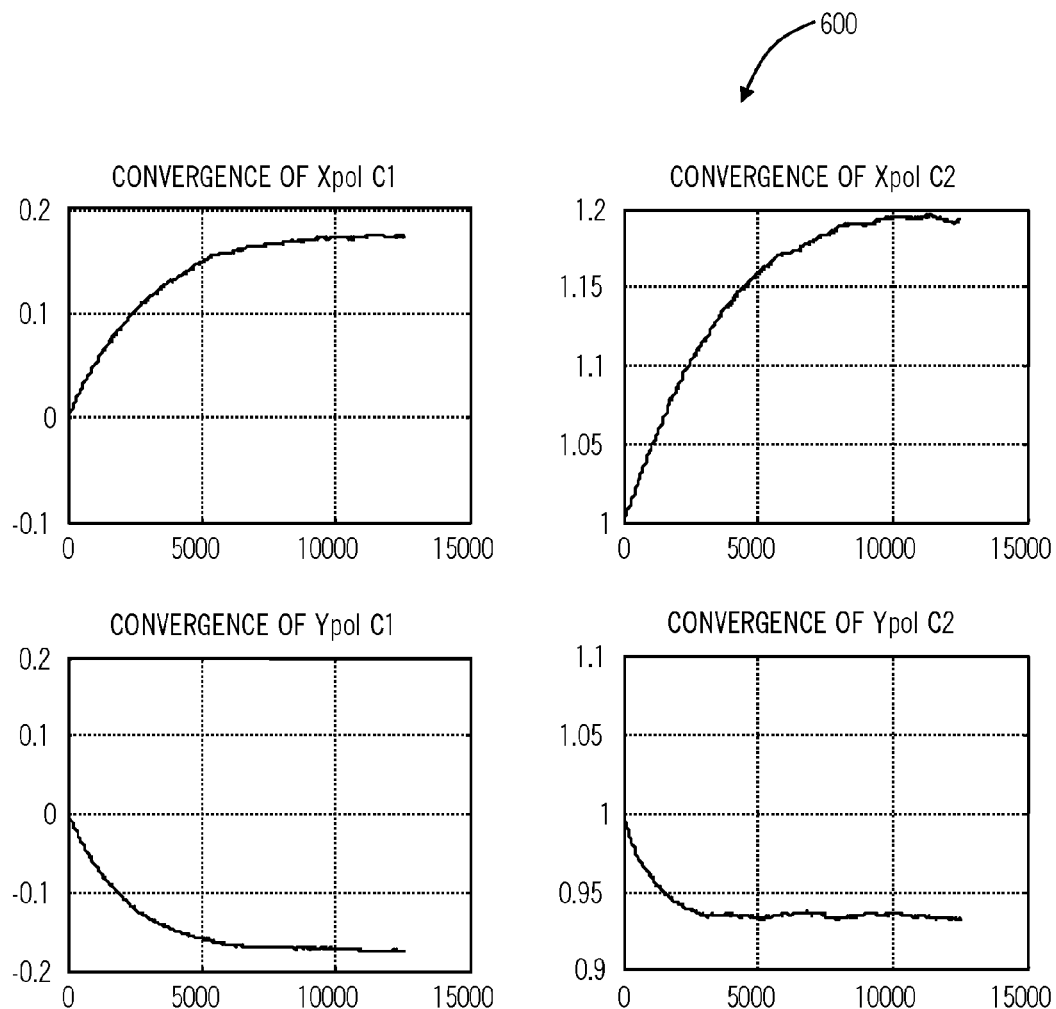
FIG. 6 is four graphs showing an exemplary case of the convergence of the correlation coefficients $c_1$ and $c_2$ using the correction system of FIG. 5.

The correction system 500 includes circuitry, digital logic, etc. configured to provide multiplication 510, 512, addition 514, and to implement a gradient descent update 516. Further, the correction system 500 includes connections to couple together the multiplication 510, 512, the addition 514, and the gradient descent update 516 between the input variables $x_i$ 502 and $x_r$ 504 to form corrected output variables $x_{ic}$ 518 and $x_{rc}$ 520. As described herein, the imbalance correction through the correction system 500 is concerned with the relative difference between quadrature paths. Thus, the output variable $x_{rc}$ 520 is set equal to the input variable $x_r$ 504. The correction coefficients $c_1$, $c_2$ are applied to the input variable $x_i$ 502 to form the output variable $x_{ic}$ 518 such that the output variable $x_{ic}$ 518=input variable $x_r$ 504 times $c_2$ plus the input variable $x_i$ 502 times $c_1$. In an exemplary operation of the correction system 500, FIG. 6 illustrates graphs 600 showing the convergence of the correction coefficients $c_1$ and $c_2$. As shown in the graphs, the convergence is relatively quick.

Of note, equation (1) and the correction system 500 illustrate correction applied to the imaginary side, i.e. correction coefficients $c_1$, $c_2$ are applied to the input variable $x_i$ 502 to form the output variable $x_{ic}$ 518. Those of ordinary skill in the art will recognize that the present invention can be applied to either arm (real or imaginary, i.e. the input variable $x_i$ 502 or the input variable $x_r$ 504). The correction system 500 may be configured to configured to set the real part of the output signal, $x_{rc}$ 520, equal to the real part of the input signal, $x_r$ 504, and to apply the correction coefficients, $c_1$ and $c_2$, to the imaginary part of the input signal, $x_i$ 502, to form the imaginary part of the output signal, $x_{ic}$ 518. Alternatively, the correction system 500 may be configured to set the imaginary part of the output signal, $x_{ic}$ 518, equal to the imaginary part of the input signal, $x_i$ 502, and to apply the correction coefficients, $c_1$ and $c_2$, to the real part of the input signal, $x_r$ 504, to form the real part of the output signal, $x_{rc}$ 520.

Advantageously, the correction system 500 does not require training symbols for the receiver system 100 unlike conventional systems and methods. Further, the correction system 500 is able to track imbalance changes in the receiver system 100 or the like during normal operations. Of note, imbalance changes may occur for various reasons such as, for example, due to temperature variations. Also, the correction system 500 can be applied to the severely distorted received signal without any additional processing or knowledge of the signal statistics, has very low complexity, and may be applied entirely in the digital domain providing precise, predictable performance. Thus, the present invention eliminates a major source of impairment in high speed optical modems that occur due to timing delays between the optical demodulator and the ADC sampling instant in a quadrature modulated system. In the absence of such a correction, the degradation of performance in the presence of high chromatic dispersion typically present on long optical links makes such a receiver non viable. The technique is a simple and effective adaptive scheme to drive impairment to zero, without the use of any calibration of training, and can be applied during normal operation of the receiver. Due to its adaptive nature it will track any changes in the differential delay of the two quadrature paths that will occur with changes in temperature.

It should be noted that the imbalance correction of the present invention is applied first before chromatic dispersion compensation. A simple model of the linear impairments affecting one polarization in the frequency domain may be represented as:

$$\begin{bmatrix} H_r & H_i \\ -H_i & H_r \end{bmatrix} \begin{bmatrix} 1 & 0 \\ -a & b \end{bmatrix}$$

where the H matrix represents the chromatic dispersion affecting the real and imaginary parts of the complex signal for each polarization. Applying the correction in the correct order yields:

$$\begin{bmatrix} H_r & H_i \\ -H_i & H_r \end{bmatrix} \begin{bmatrix} 1 & 0 \\ -a & b \end{bmatrix} \begin{bmatrix} 1 & 0 \\ \frac{a}{b} & \frac{1}{b} \end{bmatrix} \begin{bmatrix} H_r & -H_i \\ H_i & H_r \end{bmatrix} = \begin{bmatrix} 1 & 0 \\ 0 & 1 \end{bmatrix}$$

where $$H(\omega) = e^{-j\frac{\beta}{2}L\omega^2} = H_r(\omega) + jH_i(\omega)$$

and therefore $H_r^2 + H_i^2 = 1$, $\beta$ is a parameter characterizing the chromatic dispersion of the fiber per unit length, and L is the length of the fiber. Note that if the compensation is not applied in the correct order, perfect cancellation is not possible—indeed the imbalance is spread by the chromatic dispersion equalizer such that it cannot be observed and used to for correction after the chromatic dispersion equalizer has been applied.

Figure 7:
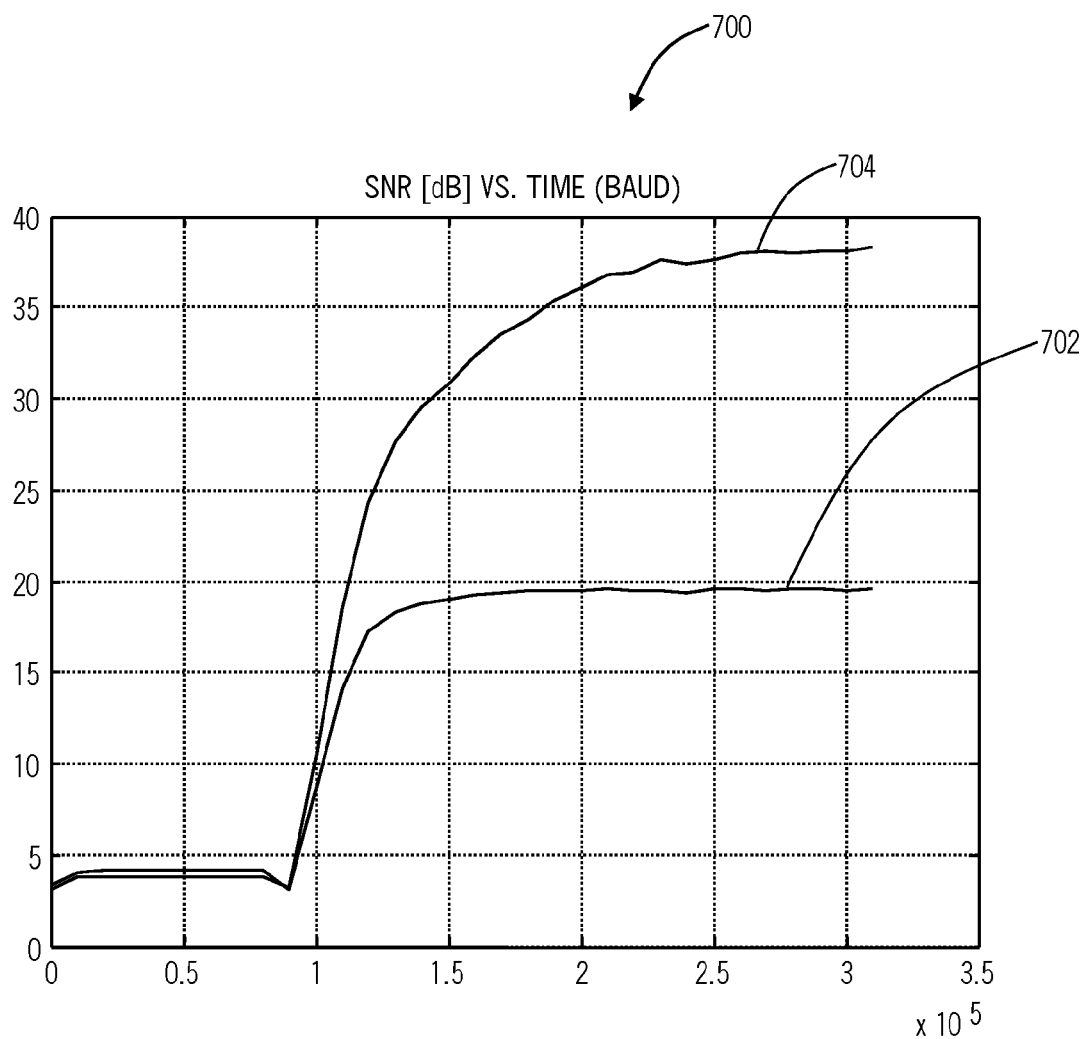
FIG. 7 is a graph of signal to noise ratio (SNR) for a typical direct conversion modem with an IQ imbalance of 1 dB and 10 degrees and with no IQ imbalance.

Referring to FIG. 7, a graph 700 illustrates signal to noise ratio (SNR) for a typical direct conversion modem with an IQ imbalance of 1 dB and 10 degrees (curve 702) and with no IQ imbalance (curve 704). As illustrated in the graph 700, the curve 704 has significantly improved SNR over the curve 702.

Referring back to FIG. 2, in an exemplary embodiment, the present invention deals with the compensation of a differential delay between the two demodulated quadrature signals on either polarization in a polarization multiplexed, quadrature modulated optical transmission system. Imbalance in the delay of the real and imaginary parts of the quadrature demodulated signal of each polarization is assumed to be a fractional delay δ of less than +/−1 sample of the real part with respect to the imaginary part, modeled as:

$$i_{rx}(nT) = i_{tx}(nT)$$

$$q_{rx}(nT) = -ai_{tx}(nT - \delta T) + bq_{tx}(nT - \delta T)$$

In the above, the convention is that a positive δ means that the Q signal is delayed with respect to the I signal. Next, the correlations (for each polarization) are defined as follows:

$$Rx_{iq} = \frac{1}{N}\sum_N i_{rx}(nT)q_{rx}(nT)$$

$$= \frac{-a}{N}\sum_N i_{tx}(nT)i_{tx}(nT - \delta T) + \frac{b}{N}\sum_N i_{tx}(nT)q_{tx}(nT - \delta T)$$

$$= \frac{-a}{N}\sum_N i_{tx}(nT)i_{tx}(nT - \delta T)$$

Where the transmitted signals $i_{tx}$ and $q_{tx}$ are known to be orthogonal, the second term is 0. The correlations may also be defined as:

$$Rx_{ipq} = \frac{1}{N}\sum_N i_{rx}(nT - T)q_{rx}(nT)$$

$$= \frac{-a}{N}\sum_N i_{tx}(nT - T)i_{tx}(nT - \delta T)$$

$$Rx_{imq} = \frac{1}{N}\sum_N i_{rx}(nT + T)q_{rx}(nT)$$

$$= \frac{-a}{N}\sum_N i_{tx}(nT + T)i_{tx}(nT - \delta T)$$

From these correlations, it follows that:

$$\delta > 0 \Rightarrow |R_{ipq}| > |R_{imq}|$$

$$\delta < 0 \Rightarrow |R_{ipq}| < |R_{imq}|$$

$$\delta = 0 \Rightarrow |R_{ipq}| = |R_{imq}|$$

where the absolute value is taken since for a>0, the correlations are negative. Based on these relationships, an updated equation for δ may be formed as:

$$\delta = \delta + \mu_d(|R_{ipq}| - |R_{imq}|)$$

The correlations are taken after the correction of the delay such that the difference ($|R_{ipq}| - |R_{imq}|$) goes to zero as δ tends to the correct delay.

Figure 8:
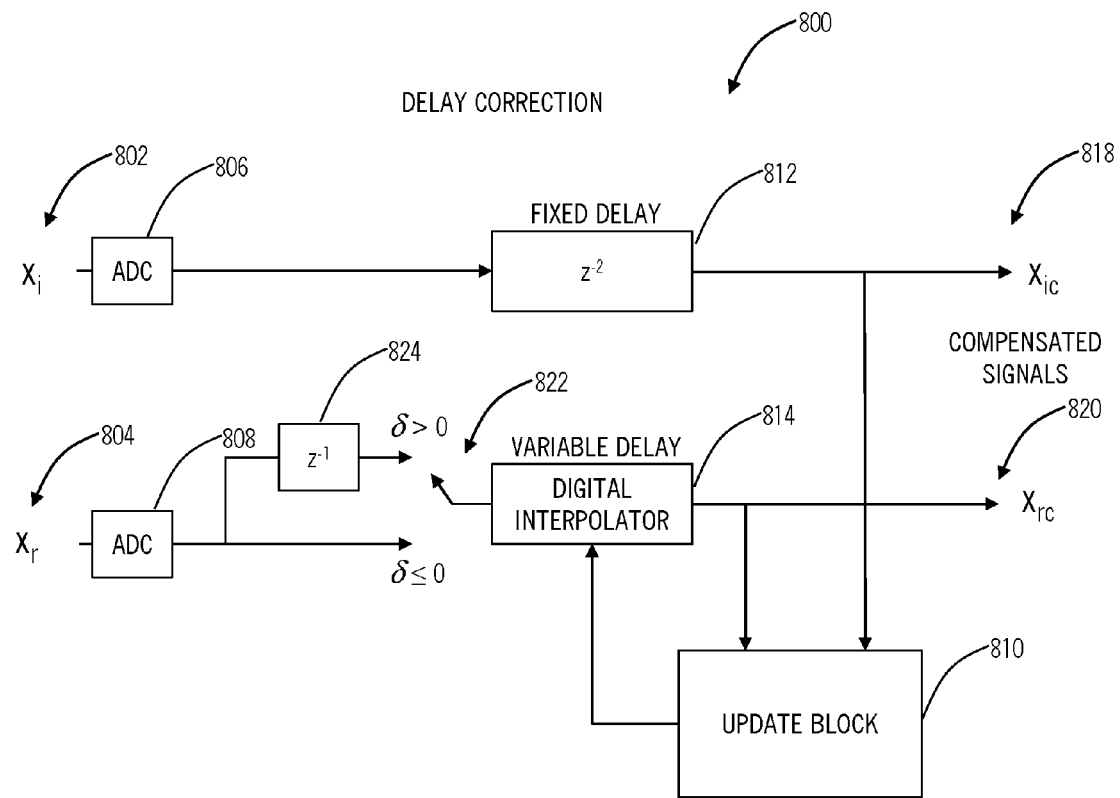
FIG. 8 is a block diagram of a delay compensation system for one polarization when the differential delay is up to +/−1 sample.
Figure 9:
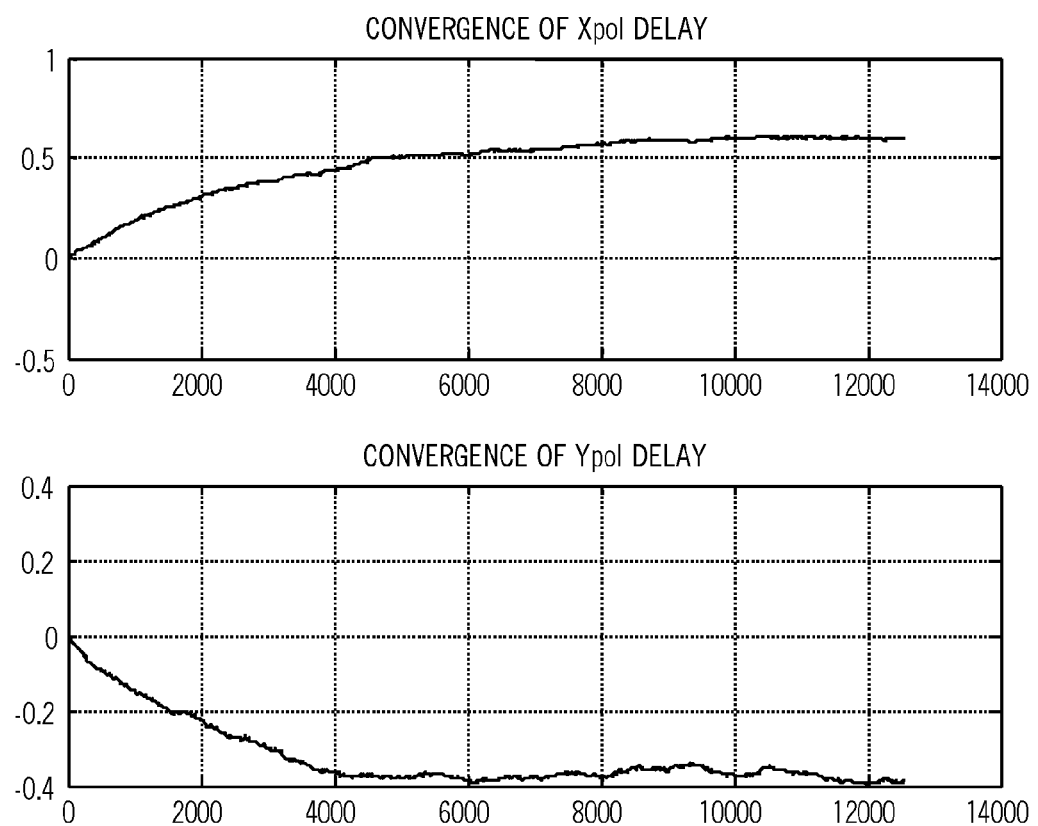
FIG. 9 is a graph showing an exemplary case of the convergence of the $X_{pol}$ and $Y_{pol}$ delays using the delay compensation system of FIG. 8.

Referring to FIGS. 8-9, a block diagram of a delay compensation system 800 is illustrated for one polarization when the differential delay is up to +/−1 sample. The delay compensation system 800 is configured to iteratively determine and correct this differential delay error entirely in the digital domain (after the ADC) in the presence of all the other impairments (PMD, CD, polarization gain imbalance, and polarization delay imbalance) using only the corrupted received signal during normal operation. Input variables $x_i$ 802 and $x_r$ 804 represent the imaginary and real parts of a complex signal for one polarization. Thus, for a dual polarization system with an x and y polarization (also referred to as a horizontal and vertical polarization), the delay compensation system 800 500 is implemented for each polarization. In an exemplary embodiment, the delay compensation system 800 is implemented in digital logic and receives the analog input variables $x_i$ 802 and $x_r$ 804 from a demodulator or the like. The delay compensation system 800 may include ADCs 806, 808 to convert the analog input variables $x_i$ 802 and $x_r$ 804 to digital. Alternatively, the ADCs 806, 808 may be external to the delay compensation system 800 with the input variables $x_i$ 802 and $x_r$ 804 already being in digital form. In general, the delay compensation system 800 is configured to implement the compensation of a differential delay between the two demodulated quadrature signals on either polarization in a polarization multiplexed, quadrature modulated optical transmission system described mathematically herein. This is accomplished using an iterative optimization approach through an updated block 810 to obtain correct delays 812, 814 between the input variables $x_i$ 802 and $x_r$ 804. The update block 810 may include any optimization algorithm, such as gradient descent or the like. Thus, instead of using training symbols, the delay compensation system 800 converges on a solution for the correct delays 812, 814.

The delay compensation system 800 includes circuitry, digital logic, etc. configured to provide the delays 812, 814 on the input variables $x_i$ 802 and $x_r$ 804 and to implement the delays 812, 814 and the update block 810 on the delays. Further, the delay compensation system 800 includes connections to couple together the delays 812, 814 and the update block 810 between the input variables $x_i$ 802 and $x_r$ 804 to form corrected output variables $x_{ic}$ 818 and $x_{rc}$ 820. The delays 812, 814 may include fixed or variable delay elements applied to the input variables $x_i$ 802 and $x_r$ 804. In an exemplary embodiment, in order to simplify the hardware, variable delay correction may be only applied to one of the real or imaginary signal side. For example, FIG. 8 is illustrated with the imaginary signal side, $x_i$ 802, receiving a fixed delay of $z^{-2}$ via the delay 812 and the real signal side, $x_r$ 804, receiving a variable delay via the delay 814 that is set responsive to the update block 810. The variable delay 814 may be connected to the input variable $x_r$ 804 through a switch 822 that, based on the delay δ, connects the input variable $x_r$ 804 directly to the variable delay 814 (if $\delta \leq 0$) or via a fixed delay 824 of $z^{-1}$ (if δ>0). In an exemplary embodiment, the variable delay may be implemented using a digital interpolator (such as a Farrow interpolator, see, e.g., L. Erup, F. M. Gardner, "Interpolation in Digital Modems—Part II: Implementation and Performance", IEEE Transactions on Communications, Vol. 41, No. 6, June 1993, pp 998-1008.) that delays the signal by an amount:

$$n_b - \delta$$

where $n_b$ is the base point of the interpolation. FIG. 9 illustrates graphs 900 of an exemplary operation of the delay compensation system 800 and the associated convergence of the delay coefficients, δ, for the two polarizations.

It may be further assumed that the delay imbalance occurs on either side with respect to an arbitrary reference point. Thus, there are two cases:

a) if the Q axis is delayed by $\delta_1 = \delta > 0$, a fractional delay $(1 - \delta_1)$ is input to the Farrow interpolator of the I signal $x_r$. The delay in the $x_r$ path is then:

$$xr\ delay(n_b - (1 - \delta_1)) = n_b - 1 + \delta_1$$

This requires a fixed delay of $n_b - 1$ in the $x_i$ path $$xi\ delay\ n_b - 1 + \delta_1;$$

b) if the I axis is delayed by $\delta_2 = -\delta > 0$, a fractional delay of $\delta_2$ is input to the Farrow interpolator of the I signal $x_r$. The delay in the $x_r$ path is then:

$$xr\ delay\ \delta_2 + (n_b - \delta_2) = n_b$$

This requires a fixed delay of $n_b$ in the $x_i$ path $$xi \text{ delay } n_b$$

In case b) above, the delay through the real part is increased by one sample, requiring a change in the fixed delay in the $x_i$ path. This is not desirable as it creates a discontinuity around the point δ=0. This problem can be overcome by shifting the base point of the digital interpolator by one when δ>0, or equivalently delaying the input to the digital interpolator by one sample for case a) above. This can be generalized and extended to a delay of more than one sample as follows:
Let $$\delta = \delta_1 - \delta_2$$

$$\delta_2 \Rightarrow \text{delay in } xr \text{ path}$$

$$\delta_1 \Rightarrow \text{delay in } xi \text{ path}$$

Then the following cases apply (with the base point of the Farrow interpolator at 2):

| Differential delay | Farrow μ | $x_r$ delay fixed | $x_r$ delay Farrow | $x_r$ delay total | $x_i$ delay total |
|---|---|---|---|---|---|
| 1 < δ ≦ 2 | 2 − δ | 3 | 2 − (2 − δ) | 3 + $\delta_1$ | 3 + $\delta_1$ |
| 0 ≦ δ ≦ 1 | 1 − δ | 2 | 2 − (1 − δ) | 3 + $\delta_1$ | 3 + $\delta_1$ |
| −1 ≦ δ ≦ 0 | $\delta_2 - \delta_1$ | 1 | 2 − ($\delta_2 - \delta_1$) | 3 + $\delta_1$ | 3 + $\delta_1$ |
| −2 ≦ δ < −1 | $\delta_2 - \delta_1 - 1$ | 0 | 2 − ($\delta_2 - \delta_1 - 1$) | 3 + $\delta_1$ | 3 + $\delta_1$ |

Figure 10:
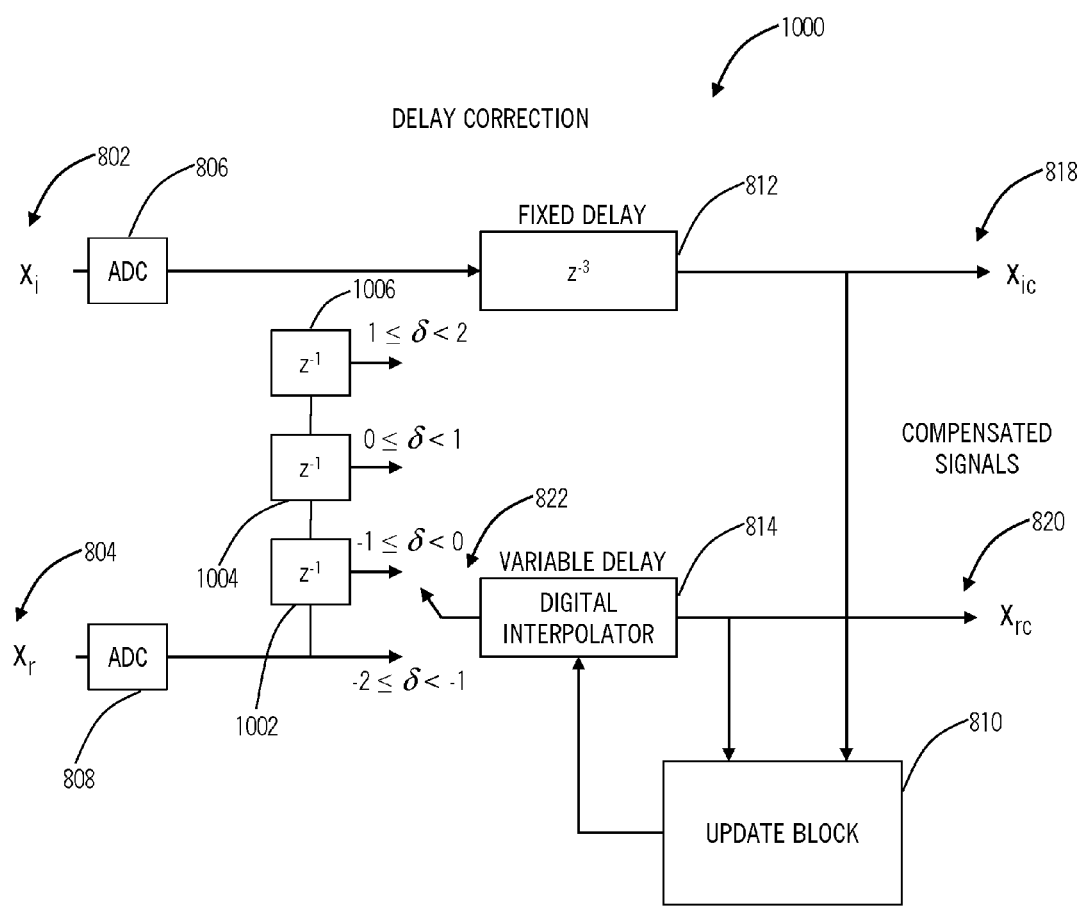
FIG. 10 is a block diagram of a delay compensation system for one polarization when the differential delay is up to +/−2 samples.

Referring to FIG. 10, a block diagram of a delay compensation system 1000 is illustrated for one polarization when the differential delay is up to +/−two samples. Of note, the delay compensation system 1000 is similar to the delay compensation system 800 illustrated in FIG. 8, and extends delay compensation for up to +/−two samples (whereas the delay compensation system 800 supports up to +/−one sample). The delay compensation system 1000 includes circuitry, digital logic, etc. configured to provide the delays 812, 814 on the input variables $x_i$ 802 and $x_r$ 804 and to implement the delays 812, 814 and the update block 810 on the delays. Further, the delay compensation system 1000 includes connections to couple together the delays 812, 814 and the update block 810 between the input variables $x_i$ 802 and $x_r$ 804 to form corrected output variables $x_{ic}$ 818 and $x_{rc}$ 820. The delay compensation system 1000 also includes addition fixed delays 1002, 1004, 1006 connected to the variable delay 814 via the switch 822. The switch 822 is set to the delays 1002, 1004, 1006 based upon the delay δ, e.g. to no delay for −2≦δ<−1, to the delay 1002 for −1≦δ<0, to the delay 1004 and the delay 1002 for 0≦δ<1, and through each of the delays 1002, 1004, 1006 for 1≦δ<2.

It should be noted that the differential delay correction of the present invention is applied first before any other compensation. A simple model of the linear impairments affecting one polarization in the frequency domain is:

$$\begin{bmatrix} H_r & H_i \\ -H_i & H_r \end{bmatrix} \begin{bmatrix} 1 & 0 \\ -a & b \end{bmatrix} \begin{bmatrix} 1 & 0 \\ 0 & e^{-j\omega\tau} \end{bmatrix}$$

where the H matrix represents the chromatic dispersion affecting the real and imaginary parts of the complex signal for each polarization. Applying the correction in the correct order yields $$\begin{bmatrix} H_r & H_i \\ -H_i & H_r \end{bmatrix} \begin{bmatrix} 1 & 0 \\ -a & b \end{bmatrix} \begin{bmatrix} 1 & 0 \\ 0 & e^{-j\omega\tau} \end{bmatrix} \begin{bmatrix} e^{-j\omega\tau} & 0 \\ 0 & 1 \end{bmatrix} \begin{bmatrix} 1 & 0 \\ \frac{a}{b} & \frac{1}{b} \end{bmatrix} \begin{bmatrix} H_r & -H_i \\ H_i & H_r \end{bmatrix} =$$

$$e^{-j\omega\tau} \begin{bmatrix} 1 & 0 \\ 0 & 1 \end{bmatrix}$$

where $$H(\omega) = e^{-j\frac{\beta}{2}L\omega^2} = H_r(\omega) + jH_i(\omega)$$

and therefore $H_r^2 + H_i^2 = 1$, β is a parameter characterizing the chromatic dispersion of the fiber per unit length, L is the length of the fiber, and τ is the differential delay between the quadrature signals. If the compensation is not applied in the correct order, perfect cancellation is not possible—indeed the imbalance is spread by the chromatic dispersion equalizer such that it cannot be observed and used to for correction after the chromatic dispersion equalizer has been applied.

Advantageously, the delay compensation systems 800, 1000 do not require training symbols for the receiver system 100 unlike conventional systems and methods. Further, the delay compensation systems 800, 1000 are able to track differential delays in the receiver system 100 or the like during normal operations. Of note, differential delays may occur for various reasons such as, for example, due to temperature variations. Also, the delay compensation systems 800, 1000 can be applied to the severely distorted received signal without any additional processing or knowledge of the signal statistics, has very low complexity, and may be applied entirely in the digital domain providing precise, predictable performance. Thus, the present invention eliminates a major source of impairment in high speed optical modems that occur due to timing delays between the optical demodulator and the ADC sampling instant in a quadrature modulated system. In the absence of such a correction, the degradation of performance in the presence of high chromatic dispersion typically present on long optical links makes such a receiver non viable. The technique is a simple and effective adaptive scheme to drive impairment to zero, without the use of any calibration of training, and can be applied during normal operation of the receiver. Due to its adaptive nature it will track any changes in the differential delay of the two quadrature paths that will occur with changes in temperature.

Figure 11:
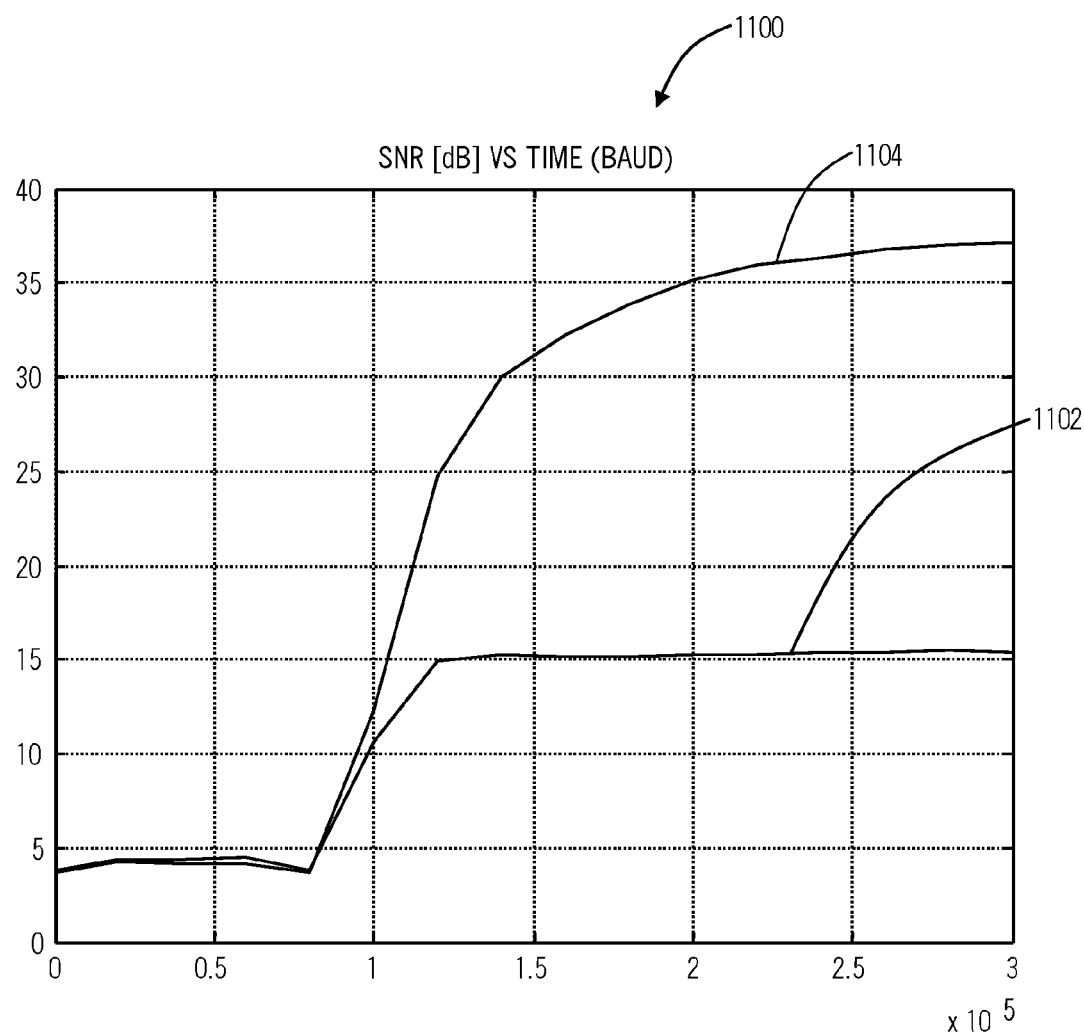
FIG. 11 is a graph of signal to noise ratio (SNR) for a typical direct conversion modem with an IQ differential delay of −0.4T and with no IQ differential delay.

Referring to FIG. 11, a graph 1100 illustrates signal to noise ratio (SNR) for a typical direct conversion modem with an IQ differential delay of −0.4T (curve 1102) and with no IQ differential delay (curve 1104). As illustrated in the graph 1100, the curve 1104 has significantly improved SNR over the curve 1102.

Figure 12:
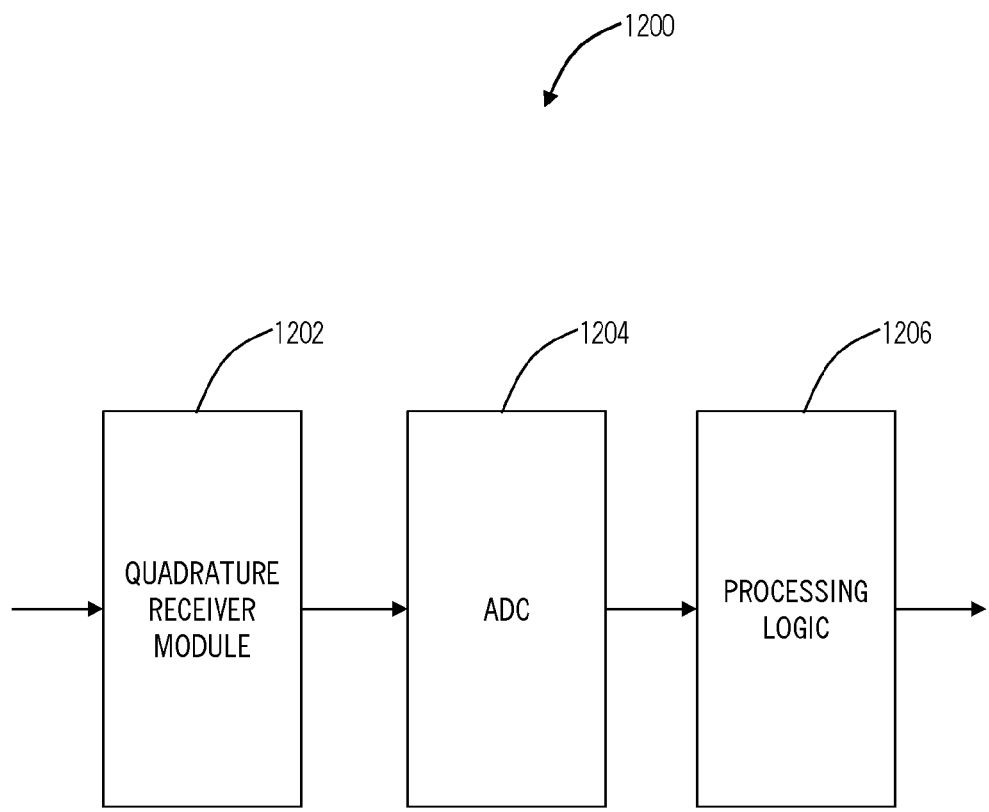
FIG. 12 is a block diagram of an impairment correction system for determining and correcting an optical angle and magnitude imbalance and for determining and correcting delay imbalance between quadrature paths.

Referring to FIG. 12, in an exemplary embodiment, a block diagram is illustrated of an impairment correction system 1200 for determining and correcting an optical angle and magnitude imbalance and for determining and correcting delay imbalance between quadrature paths. The impairment correction system 1200 may be realized in any optical receiver module, subsystem, etc. that utilizes coherent modulation, such as, for example, Quadrature Amplitude Modulation (QAM), Quadrature Phase Shift Keying (QPSK), etc. Specifically, the impairment correction system 1200 may be any high speed transmission system that use quadrature modulation and direct down conversion. The impairment correction system 1200 may include various components such as a quadrature receiver module 1202, an analog to digital converter (ADC) 1204, and processing logic 1206. The quadrature receiver module 1202 is configured to receive a transmission signal with some form of quadrature modulation and to demodulate the received transmission signal. An output of the quadrature receiver module 1202 includes an analog signal with an in-phase (I) and quadrature (Q) component. As described herein, the present invention also contemplates operation with polarization multiplexed systems in which case the quadrature receiver module 1202 would include a demodulator block for each polarization and output an analog signal for each polarization.

The ADC 1204 is configured to convert the output analog signals from the quadrature receiver module 1202 into a digital signal for time domain processing by the processing logic 1206. Note, the ADC 1204 may be integrated with the processing logic 1206. The processing logic 1206 is configured to implement the various methods described herein to compensate impairments. For example, the processing logic may be configured to implement any of the correction system 500 of FIG. 5, the delay compensation system 800 of FIG. 8, or the delay compensation system 1000 of FIG. 10. The ADC 1204 and the processing logic 1206 may be implemented or realized with any of a general purpose processor or collection of processors, a content addressable memory, a digital signal processor (DSP), an application specific integrated circuit (ASIC), a field programmable gate array (FPGA), any suitable programmable logic device (PLD), discrete gate or transistor logic, discrete hardware components, or any combination thereof, designed to perform the functions described herein. Further, the impairment correction system 1200 may be integrated in a single device, module, subsystem, or the like.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A coherent receiver, comprising:
digital circuitry configured to receive an input signal representing a quadrature modulated signal; and
iterative updating circuitry configured to determine and correct for any of optical angle and phase magnitude imbalance and for delay imbalance between quadrature paths of the input signal;
wherein the input signal comprises a real part and an imaginary part, and wherein the iterative updating circuitry is configured to process the real part and the imaginary part to form an output signal;
wherein, to determine and correct for delay imbalance between quadrature paths, the iterative updating circuitry is configured to:
process the real part of the received input signal with a first delay and the imaginary part of the received input with a second delay; and
iteratively update at least one of the first delay and the second delay responsive to the output signal; and
wherein the first delay comprises a fixed delay of two samples; wherein the second delay comprises a variable delay connected to a switch, the switch configured to connect the variable delay to the real part if a delay, $\delta$, is less than or equal to zero or to the real part through a fixed delay of one sample if the delay is greater than zero; and wherein outputs from the first delay and the second delay are connected to an update block that iteratively determines the delay, $\delta$, that in turn is used to set the variable delay.

2. The coherent receiver of claim 1, further comprising:
analog to digital conversion circuitry configured to receive the input signal in an analog form from a demodulator and to convert the input signal into a digital form for the digital circuitry.

3. The coherent receiver of claim 1, wherein, to determine and correct for optical angle and phase magnitude imbalance, the iterative updating circuitry is configured to:
process the real part and the imaginary part of the received input signal with correction coefficients to form the output signal; and
iteratively update the correction coefficients responsive to the output signal.

4. The coherent receiver of claim 3, wherein the iterative updating circuitry is configured to perform a gradient descent update algorithm on the correction coefficients.

5. The coherent receiver of claim 3, wherein the iterative updating circuitry is configured to correct for relative optical angle and phase magnitude imbalance between the quadrature paths, and wherein the iterative updating circuitry only processing one of the real part and the imaginary part with the correction coefficients.

6. The coherent receiver of claim 5, wherein the correction coefficients are defined as $c_1$ and $c_2$, the real part of the input signal is defined as $x_r$, and the imaginary part of the input signal is defined as $x_i$, a real part of the output signal is defined as $x_{rc}$, and an imaginary part of the output signal is defined as $x_{ic}$, and wherein the iterative updating circuitry is configured to set the real part of the output signal, $x_{rc}$, equal to the real part of the input signal, $x_r$, and to apply the correction coefficients, $c_1$ and $c_2$, to the imaginary part of the input signal, $x_i$, to form the imaginary part of the output signal, $x_{ic}$.

7. The coherent receiver of claim 6, wherein the correction coefficients, $c_1$ and $c_2$, are iteratively updated to provide imbalance correction without training symbols and while the coherent receiver is in operation.

8. The coherent receiver of claim 5, wherein the correction coefficients are defined as $c_1$ and $c_2$, the real part of the input signal is defined as $x_r$, and the imaginary part of the input signal is defined as $x_i$, a real part of the output signal is defined as $x_{rc}$, and an imaginary part of the output signal is defined as $x_{ic}$, and wherein the iterative updating circuitry is configured to set the imaginary part of the output signal, $x_{ic}$, equal to the imaginary part of the input signal, $x_i$, and to apply the correction coefficients, $c_1$ and $c_2$, to the real part of the input signal, $x_r$, to form the real part of the output signal, $x_{rc}$.

9. The coherent receiver of claim 1, wherein one of the first delay and the second delay comprise a variable delay with the other comprising a fixed delay.

10. The coherent receiver of claim 1, wherein the switch is further configured to connect to a plurality of fixed delays of one sample to provide delay compensation greater than one sample.

11. The coherent receiver of claim 1, wherein the delay, $\delta$, is iteratively updated to provide imbalance correction without training symbols and while the coherent receiver is in operation.

12. The coherent receiver of claim 1, wherein the iterative updating circuitry operates prior to chromatic dispersion compensation.

13. The coherent receiver of claim 1, further comprising additional digital circuitry configured and iterative updating circuitry for another polarization.

14. A method of determining and correcting for optical angle and phase magnitude imbalance in a coherent receiver, comprising:
- receiving an input signal representing a quadrature modulated signal, wherein the input signal comprises a real part and an imaginary part;
- processing the real part and the imaginary part of the received input signal with correction coefficients to form an output signal; and
- iteratively updating the correction coefficients responsive to the output signal;
- wherein, to determine and correct for delay imbalance between quadrature paths:
  - the real part of the received input signal is processed with a first delay and the imaginary part of the received input is processed with a second delay; and
  - at least one of the first delay and the second delay is iteratively updated responsive to the output signal; and
- wherein the first delay comprises a fixed delay of two samples; wherein the second delay comprises a variable delay connected to a switch, the switch configured to connect the variable delay to the real part if a delay, $\delta$, is less than or equal to zero or to the real part through a fixed delay of one sample if the delay is greater than zero; and wherein outputs from the first delay and the second delay are connected to an update block that iteratively determines the delay, $\delta$, that in turn is used to set the variable delay.

15. The method of claim 14, further comprising:
demodulating a received signal to form the input signal in an analog format; and
converting the input signal in the analog format to a digital format prior to processing the received input signal.

16. A method of determining and correcting for delay imbalance between quadrature paths in a coherent receiver, comprising:
- receiving an input signal representing a quadrature modulated signal, wherein the input signal comprises a real part and an imaginary part;
- processing the real part of the received input signal each with a first delay and the imaginary part of the received input with a second delay to form an output signal; and
- iteratively updating at least one of the first delay and the second delay responsive to the output signal;
- wherein:
  - the real part of the received input signal is processed with a first delay and the imaginary part of the received input is processed with a second delay; and
  - at least one of the first delay and the second delay is iteratively updated responsive to the output signal; and
- wherein the first delay comprises a fixed delay of two samples; wherein the second delay comprises a variable delay connected to a switch, the switch configured to connect the variable delay to the real part if a delay, $\delta$, is less than or equal to zero or to the real part through a fixed delay of one sample if the delay is greater than zero; and wherein outputs from the first delay and the second delay are connected to an update block that iteratively determines the delay, $\delta$, that in turn is used to set the variable delay.

17. The method of claim 16, further comprising:
demodulating a received signal to form the input signal in an analog format; and converting the input signal in the analog format to a digital format prior to processing the received input signal.

* * * * *